(12) United States Patent
Pettersson

(10) Patent No.: US 11,383,568 B2
(45) Date of Patent: Jul. 12, 2022

(54) LOAD-CARRYING VEHICLE PART AND A WHEELED VEHICLE EQUIPPED WITH SUCH VEHICLE PART

(71) Applicant: Komatsu Forest AB, Umeå (SE)

(72) Inventor: Henry Pettersson, Täfteå (SE)

(73) Assignee: Komatsu Forest AB, Umeå (SE)

( * ) Notice: Subject to any disclaimer, the term of this patent is extended or adjusted under 35 U.S.C. 154(b) by 0 days.

(21) Appl. No.: 17/275,134

(22) PCT Filed: Sep. 5, 2019

(86) PCT No.: PCT/SE2019/050834
§ 371 (c)(1),
(2) Date: Mar. 10, 2021

(87) PCT Pub. No.: WO2020/055306
PCT Pub. Date: Mar. 19, 2020

(65) Prior Publication Data
US 2022/0032700 A1  Feb. 3, 2022

(30) Foreign Application Priority Data

Sep. 14, 2018  (SE) .................................... 1851090-9

(51) Int. Cl.
*B60G 3/14* (2006.01)
*B62D 7/02* (2006.01)
(Continued)

(52) U.S. Cl.
CPC .............. *B60G 3/145* (2013.01); *B62D 7/02* (2013.01); *B62D 7/142* (2013.01); *B62D 21/186* (2013.01);
(Continued)

(58) Field of Classification Search
CPC .... B60G 3/145; B60G 2300/083; B62D 7/02; B62D 7/142; B62D 21/186; B62D 33/0215; B62D 55/116; B62D 59/02
See application file for complete search history.

(56) References Cited

U.S. PATENT DOCUMENTS 3,602,523 A * 8/1971 Poulos ................... B60G 5/047
280/682
6,247,196 B1 * 6/2001 Jurmu ....................... B60G 5/02
280/81.6
(Continued)

FOREIGN PATENT DOCUMENTS

DE    19717866 A1 * 10/1998 ............. B60G 3/145
EP    1308378 A1 *  5/2003 ........... B62D 55/305
(Continued)

*Primary Examiner* — James A English
*Assistant Examiner* — Scott F. Underwood
(74) *Attorney, Agent, or Firm* — Morrison & Foerster, LLP

(57) ABSTRACT

The invention relates to a load-carrying vehicle part with a first and a second wheel pair (10, 11), which are suspended in a respective bogie element (20) on each side of a frame member (14), a suspension (15) between each bogie element (20) and the frame member (14) on each side of the vehicle part to manipulate the frame member relative to the respective wheel pairs (10, 11), or support the frame member in a springing manner, each suspension (15) comprises a first and a second rocker arm (26A, 26B), wherein the first rocker arm is located in front of the second rocker arm viewed in the normal forward direction of driving of the vehicle part, that each rocker arm (26A, 26B) with its one end is pivotably in a joint (27, 27) in the frame member (14) and with its other end is pivotably in a joint (28, 28) in the bogie element (20) a first spring leg (25A) and a second spring leg (25B), wherein each spring leg with its one end (30) is articulately fastened to the frame member (14) and with its other end
(Continued)

Figure 1:
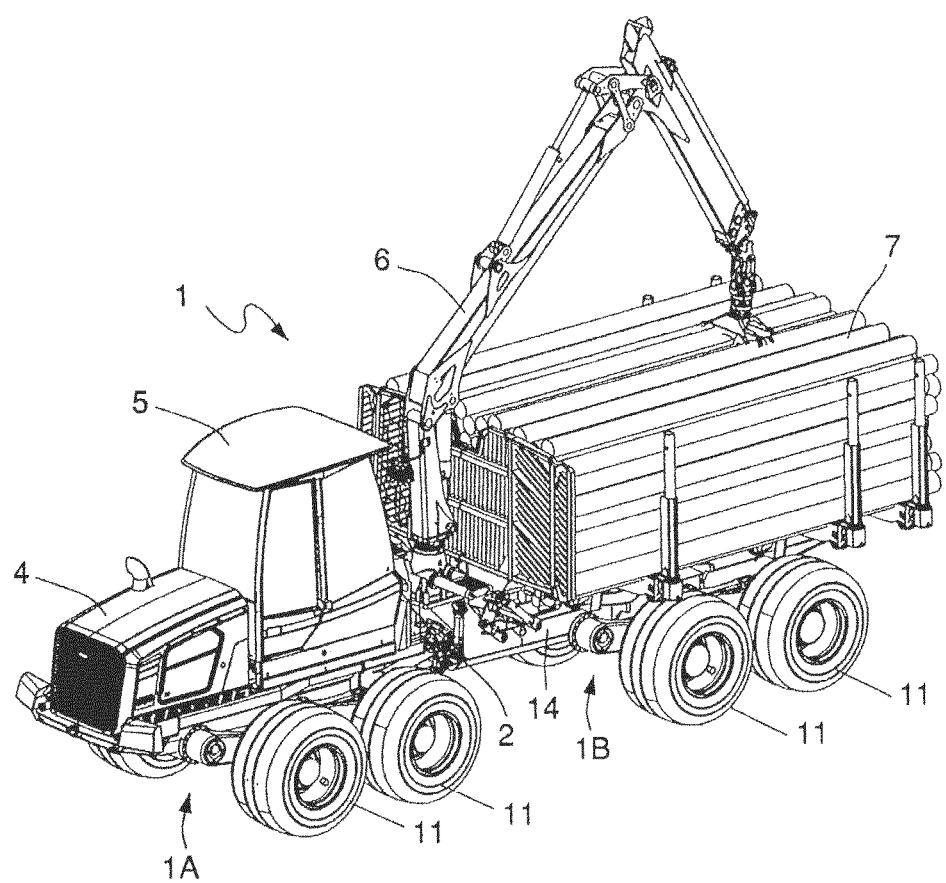

(31) is articulately fastened in a rocker arm (26A, 26B), a motion conversion arrangement (29) capable of converting a rotary motion in a joint (27, 28) for one of the rocker arms (26A, 26B) to a forward and backward translation motion.

12 Claims, 4 Drawing Sheets

(51) Int. Cl.
    *B62D 7/14*     (2006.01)
    *B62D 21/18*     (2006.01)
    *B62D 33/02*     (2006.01)
    *B62D 55/116*     (2006.01)
    *B62D 59/02*     (2006.01)

(52) U.S. Cl.
    CPC ........ *B62D 33/0215* (2013.01); *B62D 55/116* (2013.01); *B62D 59/02* (2013.01); *B60G 2300/083* (2013.01)

(56) References Cited

U.S. PATENT DOCUMENTS

| | | | |
|---|---|---|---|
| 11,021,032 B2 * | 6/2021 | Chourey | B60G 17/017 |
| 2004/0245739 A1 * | 12/2004 | Larson | B60G 5/00 |
| | | | 280/124.163 |
| 2018/0215426 A1 * | 8/2018 | Lewis | B62D 55/10 |
| 2020/0009932 A1 * | 1/2020 | Pettersson | B62D 55/116 |

FOREIGN PATENT DOCUMENTS

| | | | | |
|---|---|---|---|---|
| EP | 3595961 A1 | | 1/2020 | |
| JP | 2003040153 A | * | 2/2003 | |
| JP | 2010070164 A | * | 4/2010 | |
| WO | WO-2014182235 A1 | * | 11/2014 | ........ B60G 21/073 |
| WO | WO-2017007396 A1 | * | 1/2017 | ........ B62D 59/04 |
| WO | WO-2018169468 A1 | | 9/2018 | |

* cited by examiner

LOAD-CARRYING VEHICLE PART AND A WHEELED VEHICLE EQUIPPED WITH SUCH VEHICLE PART

CROSS REFERENCE TO RELATED APPLICATIONS

This application is a national stage application under 35 U.S.C. § 371 of International Application No. PCT/SE2019/050834, filed internationally on Sep. 5, 2019, which claims priority to SE 1851090-9, filed Sep. 14, 2018, the disclosures of which are herein incorporated by reference in their entirety.

The present invention relates to a load-carrying vehicle part according to the preamble of claim 1 and a wheeled vehicle, specifically a forwarder equipped with such vehicle part according to claim 12.

A load-carrying vehicle part of wheeled, specifically off-road vehicles, such as a forwarder or a dumper, usually has no other springing that the springing capacity of the tyres themselves. The springing properties will thereby be adjusted to driving with full load, which implies a relatively hard springing, which is practically non-existent when driving without load. A goods vehicle that advances on an uneven foundation and can come across various types of obstacles in the terrain. In order to work efficiently, a vehicle with good driving comfort, both loaded and unloaded, must be able to move quickly in terrain where the characteristics and nature of the foundation can vary greatly.

It has turned out that even small obstacles can lead to significant vertical accelerations of the vehicle when driving an unloaded vehicle. Vertical acceleration is a measure of a vehicle's acceleration from an imaginary centre of curvature when driving in vertical curves, i.e. in practice when the vehicle passes obstacles or a rise in the terrain. Also in cases where the foundation's surface structure has relatively low obstacle height of the "washboard" type, such large accelerations of 3-5 g can occur also at such relatively low vehicle speeds as 5-10 km/h.

Vertical accelerations and driving of unloaded vehicles are thus very strenuous for both the driver and the vehicle whereby the driver can experience considerable discomfort and at the same time, the vehicle is exposed to unnecessary wear and large mechanical strains. Lateral accelerations also occur.

Known wheel suspensions for vehicles of the type described above moreover implies that the theoretical maximum speed and hence capacity of the vehicle cannot be fully utilised. Add to this that the surface structure and vegetation of the foundation will to a large extent be exposed to wear and damage due to the jumping movements of the vehicle.

An object of the present invention is to provide a wheel suspension for an off-road goods vehicle with which the disadvantages outlined above can be avoided. Another object is to provide a vehicle, which at a given obstacle height in the terrain can advance at a higher speed without increasing momentarily occurring vertical accelerations.

The first objective of the invention is obtained by means of a load-carrying vehicle part of the type stated in claim 1. The second object of the invention is obtained, according to claim 12, by equipping a load-carrying vehicle of the type that have bogie-mounted wheels, specifically an articulated vehicle with a load-carrying vehicle part according to the invention.

With the wheel suspension according to the invention, the vehicle's springing properties can be adjusted to the prevailing ground conditions and the load weight carried so that the vehicle can offer softer springing when the vehicle is unloaded, whereby unevenness in the foundation can be captured so that they give rise to smaller vertical accelerations in the body or chassis of the vehicle.

Figure 2:
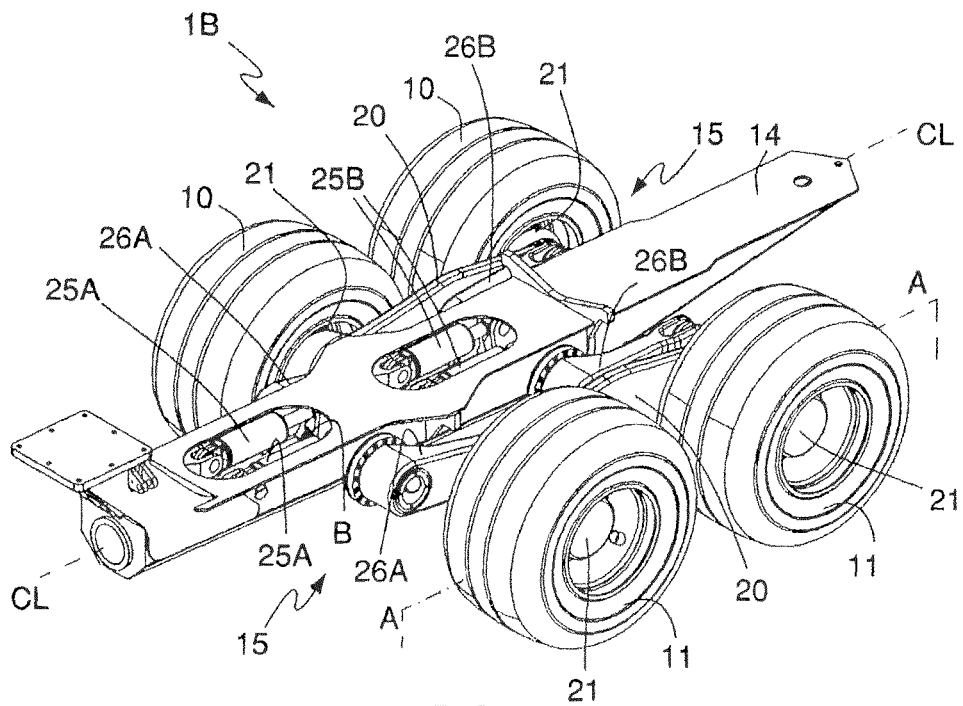
Figure 3:
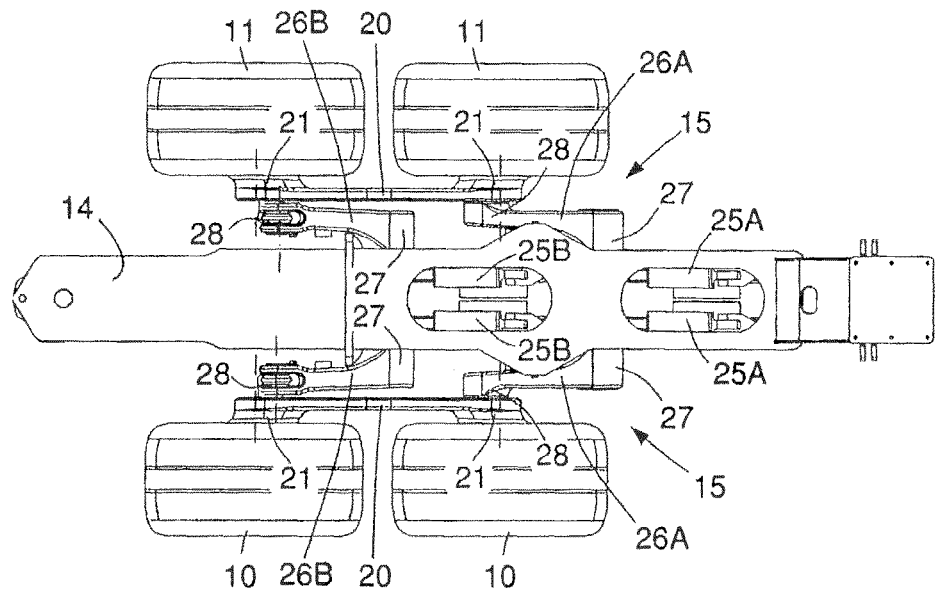
Figure 4:
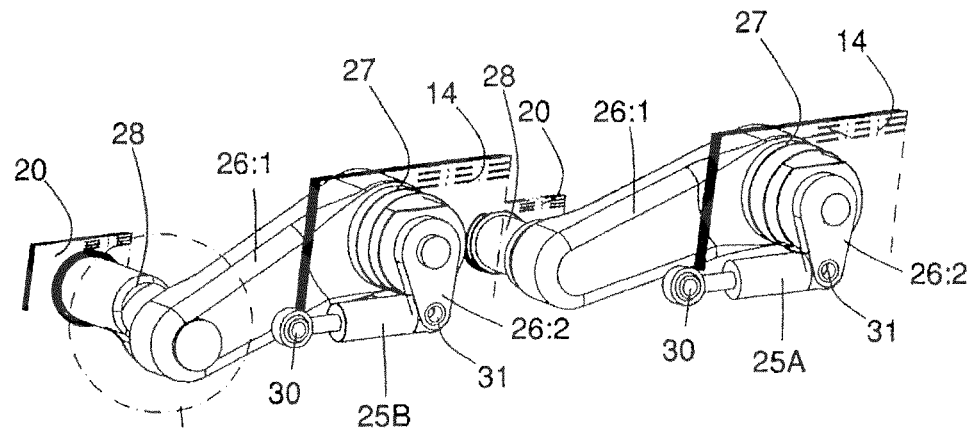
Figure 5A:
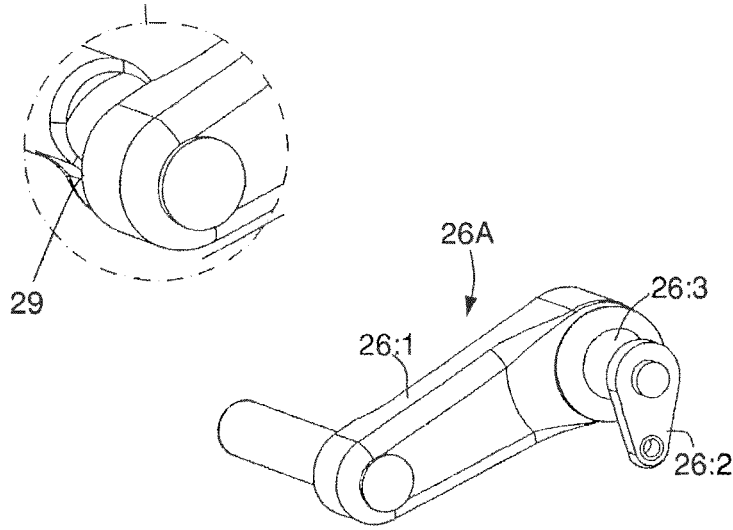
Figure 5B:
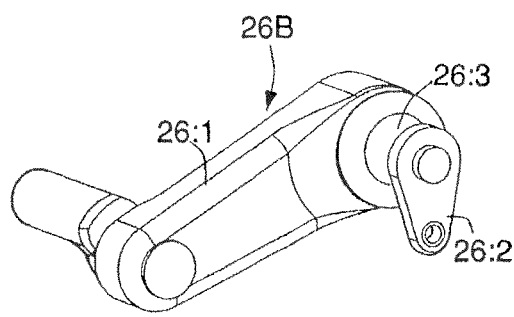
Figure 6:
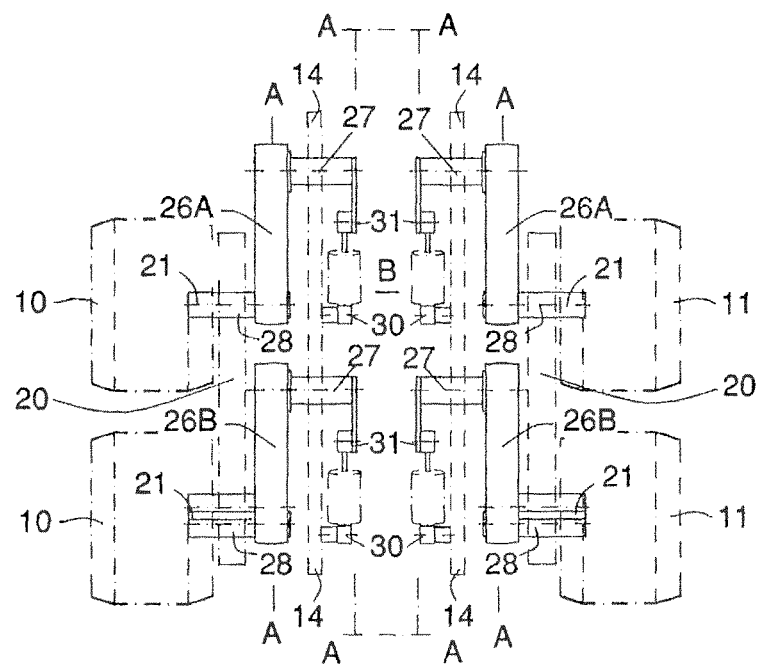
Figure 7:
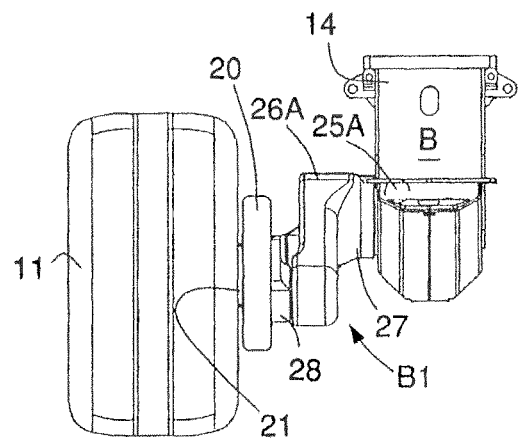

In the following, an exemplary embodiment of the invention is described in further detail with reference to the accompanying drawing, in which;

FIG. 1 shows a view in perspective of a wheeled goods vehicle in the form of a forwarder equipped with a wheel suspension according to the invention, FIG. 2 shows a view in perspective askew from above of a load-carrying vehicle part with a wheel suspension according to the invention, FIG. 3 shows a plan view from above of a load-carrying vehicle part with a wheel suspension according to the invention, FIG. 4 schematically shows a side view of a wheel suspension according to the invention and in detail enlargement an eccentrically operating alternating motion mechanism, FIGS. 5A, 5B show a perspective view of a first respectively a second rocker arm, which configured as double arm levers, can be included in a suspension device according to the invention, FIG. 6 schematically shows a plan view of a vehicle part with partially removed parts and equipped with a wheel suspension according to the invention, FIG. 7 shows a side view from behind of a vehicle part with a wheel suspension according to the invention, FIG. 1 shows a wheeled vehicle 1, which in the exemplary embodiment described in the following is constituted by an articulated forest machine in the form of a forwarder, but which could clearly comprise any wheeled goods vehicle, such as a dumper or the like.

The vehicle 1 comprises a combination, which substantially comprises a front 1A respectively rear 1B vehicle unit, which is articulately joined via a steering joint 2. Said front vehicle unit 1A sustains a superstructure, comprising a propulsion engine 4 and a driving cab 5, and the rear vehicle unit 1B a superstructure comprising a lifting crane 6 and a cargo compartment 7 for timber. The vehicle 1 can comprise eight in a hydrostatic manner individually drivable wheels, which are arranged in pairs 10, 11, in a line after each other on a respective bogie element, on said front respectively rear vehicle unit.

As shown in FIGS. 2 and 3, the wheels 10, 11 are mounted in pairs on bogie elements 20, which are individually pivotably suspended relative to the chassis in a manner that will appear in more detail from the following. Each wheel is rotatably lodged in a hub 21 in the bogie element and arranged at an outer side of the bogie element 20.

It should be understood that the vehicle's 1 front 1A respectively rear vehicle part 1B substantially can be identical. For the sake of simplicity, only the rear substantially load-carrying vehicle part 1B is described below and is shown in more detail in FIGS. 2 and 3.

The read vehicle part 1B comprises a first wheel pair 10 and a second wheel pair 11, wherein the wheels in each pair are located after each other (one after the other). Each wheel pair 10, 11 is via said hub 21 suspended in a respective bogie element 20 so as to support a longitudinal frame member 14 between them, extending along a centre line (CL) between said first and second wheel pairs 10, 11.

Between each bogie element 20 and the central frame member 14, a suspension, generally designated 15, is arranged on each side of the vehicle, involving spring legs 25A, 25B, which hereby are constituted by hydraulically acting piston-cylinder means. This suspension 15 is intended to enable manipulation of the frame member 14, via the hydraulic action, raising and lowering the frame member 14 relative to the respective wheel pairs 10, 11. The suspension 15 also makes it possible to position check the frame member 14 angle to the foundation.

Each suspension 15 comprises rocker arms 26A, 26B, configured as a first respectively a second double-arm lever, one lever arm 26:1 respectively second lever arm 26:2 of which are mutually joined via an intermediate carcass 26:3. The intermediate carcass 26:3 of each lever is pivotably lodged in a hub sleeve 28 in a respective joint in the frame member 14, so that said respective rocker arms 26A, 26B can swing in one plane A-A, which is parallel to a plane of rotation of the respective wheel pairs 10, 11. Each of said rocker arms 26A, 26B can suitably be made in shell formation or at least have an axially travelling duct through the entire rocker arm from end to end. Above said bogie element 20, it can also suitably be made in shell formation or be configured as a hollow case structure.

As most clearly appears from FIGS. 2 and 3, the central frame member 14 forms part of a vehicle unit 1B constituent in the load-carrying body or chassis, which in the known manner can support a drive train, control arrangement etc. To be torsionally rigid, lightweight and accommodate components that form part of the present invention, the load-carrying body has been given a box-like shape with an internal space B, see also FIGS. 6 and 7.

The frame member 14 is made of two longitudinal beams, so-called longerons, travelling substantially parallel to the longitudinal direction of the vehicle unit, each of which beams has an upper flange, a lower flange and a connection carcass. By means of a selection of suitable hydraulic components, for example by the action of check valves and/or gas accumulators (gas hydraulics), each of the above-mentioned piston-cylinder means 16, which form part of the suspension 15, can be caused to have a springy action in the same manner as spring legs.

Each suspension 15 on each side of the frame member 14 comprises a combination of a first spring leg 25A and a first rocker arm 26A as well as a combination of a second spring leg 25B and a second rocker arm 26B, with which combinations the frame member 14 is spring-supported to a front respectively a rear end of the bogie beam 20. The first rocker arm 26A is located in front of the second rocker arm 26B viewed in the vehicle's normal forward direction of driving. Each rocker arm 26A, 26B is with its one end pivotably fastened in a joint via said hub sleeve 27, 27 in the chassis frame member 14 and with its other end pivotably fastened in a joint via a hub sleeve 28, 28 in the bogie beam 20.

As most clearly appears from FIGS. 6 and 7, each spring leg 25A, 25B is with its one end 30, 30 articulately fastened in the chassis frame member 14 and with its other end 31, 31 articulately fastened in a rocker arm 26A, 26B. It should be understood that each of said first and second rocker arms 26A, 26B can swing in planes that are parallel to the plane of rotation A, A of the wheel pairs 10, 11.

As most clearly appears from FIGS. 3 and 4, each spring suspension 15, on each side of the frame member 14, comprises a swing arm device with said first and second rocker arms 26A, 26B each of which is pivotably connected between the chassis frame member 14 and the bogie beam 20. Said rocker arms 26A, 26B acting in pairs are articulately attached to a side of the bogie beam 20 facing the frame member 14, while the wheels 10, 11 in each pairs, via a respective hub 21, are rotatably lodged suspended in an opposite other side of the bogie beam 20. In an embodiment, each rocker arm's 26A, 26B respective joint 28, 28 in the bogie beam 20 and the wheels' 10, 11 respective hub 21 are located substantially facing each other, but on opposite sides of the bogie beam 20. Suitably, said joints 28, 28 can at least for the front first rocker arm 26A and said hub 21 in the bogie beam 20 have coinciding or substantially concentric shafts as appears from FIG. 3.

Of the both rocker arms 26A, 26B acting in pairs, one is located in front of the other one viewed in the vehicle's normal forward direction of driving and each of said rocker arms can be oriented inclined forward or rearward so that each of the rocker arms acting in pairs with portions coupled thereto forms a kind of geometric parallelogram.

As most clearly appears from FIGS. 3 and 4, each rocker arm 26A, 26B with its one end is pivotably fastened in a joint 27, 27 in the chassis frame member 14 and with its other end in a joint 28, 28 in the bogie beam 20. Furthermore, each spring leg 25A, 25B with its one end 30, 30 is articulately fastened in the chassis frame member 14 and with its other end 31, 31 articulately fastened in a rocker arm 26A, 26B. Furthermore, said rocker arms 26A, 26B are arranged to swing in planes that are parallel with the wheel pairs' 10, 11 plane of rotation A-A, which is illustrated in FIG. 2.

As shown in FIGS. 4 and 5A, 5B and as mentioned above, in one embodiment of the invention, the first and second rocker arms 26A, 26B comprise double-arm levers with two substantially V-shaped angularly directed first and second lever arms 26:1, 26:2, which are interconnected in an intermediate carcass 26:3. The first rocker arm's 26A intermediate carcass 26:3 is pivotably lodged in a first joint, which is defined by a hub sleeve 27 in a portion, indicated in FIG. 4, of a frame beam of the chassis frame member 14. Correspondingly, the second rocker arm's 26B intermediate carcass 26:3 is pivotably lodged in a second joint, which is defined by a hub sleeve 28 in a portion, indicated in FIG. 4, of a frame beam that is comprised in the chassis frame member 14.

With reference to FIG. 6, it is schematically shown how the first and second rocker arms 26A, 26B longer one lever arm 26:1 respectively shorter second lever arm 26:2 are arranged to swing in one respective plane A-A, which is parallel to each other but located at a distance from each other.

As shown in FIGS. 6 and 7, the respective rocker arms' 26A, 26B longer one lever arm 26:1 in a side space, generally designated B1, which is delimited between the chassis frame member 14 and the bogie beam 20, while the shorter second lever arm 26:2 swings in one plane, which is located in the space B, which is delimited within the chassis' box-shaped frame member 14.

Also referring to FIG. 4, the first rocker arm's 26A substantially longer one lever arm 26:1 is thus at its free end equipped with a pivot pin by which it is pivotably lodged in a hub sleeve 28 in a first joint in the bogie beam 20 and the substantially shorter second lever arm 26:2 is in force-transmitting connection with the chassis frame member 14 via said first spring leg 25A. Correspondingly, the second rocker arm's 26B substantially longer one lever arm 26:1 is at its free end equipped with a pivot pin by which it is pivotably lodged in a hub sleeve 28 in a second joint in the bogie beam 20, and the substantially shorter lever arm 26:2 is in force-transmitting connection with the chassis frame member 14 via said second spring leg 25B.

Said respective spring legs 25A, 25B are at their ends jointly connected partly with the rocker arm's 26A, 26B shorter second lever arm 26:2, partly with the chassis frame member 14.

It should be understood that due to each spring leg 25A, 25B comprising a hydraulic cylinder, via a valve function in a hydraulic circuit not shown in the figures, a pressure medium flow applies a moment force to said second lever arm 26:2, whereby the frame member's 14 state relative to the wheel pair 10, 11 and hence the foundation can be position- or level-checked independently of the ground conditions. In the embodiment according to the invention in which the spring legs 25A, 25B comprise hydraulic cylinders, it is possible to actively swing or raise/lower the chassis frame member 14 relative to the bogie element 20. Alternatively, the hydraulic fluid can be throttled, blocked so that said respective hydraulic cylinder offers a limited resilience/alleviation adjusted to the load's relative weight, or the chassis frame member 14 can simply be locked in a specific position relative to the wheel pair 10, 11 and thereby the foundation.

In the exemplary embodiment described here, the arrangement comprises an eccentrically operating alternating motion mechanism 29 in connection with the joints between the rocker arms 26B and the bogie element 20. The alternating motion mechanism 29 comprises an eccentric clutch of the type schematically shown in the enlarged detail in FIG. 4 and is selected so that it can convert the rotary motion in the joints 28, 28 to a forward and backward translation motion so in this manner to present a distance-adjusting means between said joints, which ensures that the centre-to-centre distance c/c in the joints 28, 28 between the rocker arm 26A, 26B and the bogie beam 20 can be varied depending on the prevailing relative swing movements between the frame member 14 and the bogie element 20.

It should hereby be understood that in the embodiment described here, only the (rear) second rocker arm 26B is equipped with said motion conversion arrangement 29. The first rocker arm 26A is thus devoid of said arrangement, but could in an alternative embodiment clearly easily be equipped with such arrangement instead of the said second rocker arm 26B. Alternatively, each rocker arm 26A, 26B could be equipped with a motion conversion arrangement 29 capable of converting a rotary motion in a joint for either lever arm to a forward and backward translation motion. The translation motion should suitably take place in a controlled manner within a limited angle area that is less than 360°.

In an alternative embodiment, the motion conversion arrangement would clearly be constituted by any arrangement with equivalent functions known to the skilled person, for example any type of planetary gear that causes epicyclic motion. In its most trivial form, the motion conversion arrangement should for example be constituted by a type of sliding mechanism.

The invention claimed is:

1. A load-carrying vehicle part, comprising
a first wheel pair and a second wheel pair, wherein the wheels in each pair are located in sequence and suspended in a respective bogie element on each side of a longitudinal frame member, which extends along a centre line between said first and second wheel pairs, and the wheels in each pair comprise a wheel hub,
a suspension, which is arranged between each bogie element and the frame member on each side of the vehicle part to enable manipulation of the frame member state relative to the respective wheel pairs or to carry the frame member between them in a springing manner, wherein
each suspension comprises
a first rocker arm and a second rocker arm, wherein the first rocker arm is located in front of the second rocker arm viewed in the vehicle part's normal forward direction of driving,
each rocker arm with its one end is pivotably fastened in a joint in the frame member and with its other end pivotably fastened in a joint in the bogie element,
a first spring leg and a second spring leg, wherein each spring leg with its one end is articulately fastened in the frame member and with its other end is articulately fastened in the corresponding rocker arm, and
a motion conversion arrangement capable of converting a rotary motion in the joint in the frame member, the joint in the bogie element, or both joint for one of the rocker arms to a forward and backward translation motion to accommodate changes in distance between the rocker arms' joints.

2. The vehicle part according to claim 1, wherein the first and second spring legs comprise a hydraulically acting piston-cylinder means.

3. The vehicle part according to claim 1, wherein the first and second rocker arms each are configured as a double-arm lever comprising a first lever arm and a second lever arm, and wherein the first lever arm and the second lever arm are connected via an intermediate carcass.

4. The vehicle part according to claim 3, wherein said intermediate carcass is pivotably lodged in a hub sleeve in the frame member so that said first lever arm and the second lever arm connected by the intermediate carcass can swing in planes that are parallel to a plane of rotation of the respective wheel pairs.

5. The vehicle part according to claim 3, wherein the first lever arm of each rocker arm is pivotably lodged in a hub sleeve in the bogie element, and the second lever arm, via a joint, is in force-transmitting connection with the frame member via the first spring leg, the second spring leg, or both.

6. The vehicle part according to claim 5, wherein the first lever arm of each rocker arm, via the hub sleeve, is articulately fastened on a first side of the bogie element, while the wheel pairs' respective wheel hub is rotatably fastened to an opposite side of the bogie element.

7. The vehicle part according to claim 5, wherein the first lever arm of each rocker arm, via its hub sleeve, is articulately fastened facing or coaxially with one of the wheel hubs in the bogie element.

8. The vehicle part according to claim 3, wherein the first lever arm of each rocker arm is longer than the second lever arm.

9. The vehicle part according to claim 3, wherein the first lever arm and the second lever arm of each rocker arm are mutually located in an angle position in V shape.

10. The vehicle part according to claim 3, wherein the frame member has an internal space, in which each rocker arm's second lever arm is accommodated together with the first spring leg, the second spring leg, or both acting against said lever arm.

11. The vehicle part according to claim 1, wherein the motion conversion arrangement comprises an eccentrically operating alternating motion mechanism.

12. A vehicle with bogie-mounted wheels comprising a load-carrying vehicle part according to claim 1.

* * * * *